United States Patent
Axelsson et al.

(10) Patent No.: US 8,307,649 B2
(45) Date of Patent: Nov. 13, 2012

(54) ARRANGEMENT OF A TWO STAGE TURBOCHARGER SYSTEM FOR AN INTERNAL COMBUSTION ENGINE

(75) Inventors: Pal Axelsson, Sodertalje (SE); Hans Drangel, Stockholm (SE); Björn Lund, Haninge (SE)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 12/020,948

(22) Filed: Jan. 28, 2008

(65) Prior Publication Data

US 2008/0178591 A1   Jul. 31, 2008

(30) Foreign Application Priority Data

Jan. 31, 2007 (EP) ...................................... 0710850

(51) Int. Cl.
  *F02B 33/44* (2006.01)
  *F02B 37/00* (2006.01)
  *F02B 37/013* (2006.01)
  *F02B 33/00* (2006.01)
(52) U.S. Cl. ............ 60/612; 60/611; 60/605.1; 123/562
(58) Field of Classification Search ............ 60/612, 60/611, 605.1, 602, 322; 123/562; *F02B 37/00, F02B 37/013*
  See application file for complete search history.

(56) References Cited

U.S. PATENT DOCUMENTS

| | | | | |
|---|---|---|---|---|
| 4,265,471 A * | 5/1981 | Nash | .............................. | 285/111 |
| 4,344,289 A * | 8/1982 | Curiel et al. | ..................... | 60/612 |
| 4,559,783 A * | 12/1985 | Ampferer | ..................... | 60/605.1 |
| 4,562,800 A * | 1/1986 | Tsujibayashi | .............. | 123/195 A |
| 4,930,315 A * | 6/1990 | Kanesaka | ........................ | 60/600 |
| 6,293,103 B1 * | 9/2001 | Gladden | ......................... | 60/612 |
| 6,354,815 B1 * | 3/2002 | Svihla et al. | .................. | 417/407 |
| 6,802,184 B2 * | 10/2004 | Huter et al. | ..................... | 60/612 |
| 6,981,375 B2 | 1/2006 | Sisken et al. | | |
| 7,287,379 B2 * | 10/2007 | Gobert et al. | .................... | 60/612 |
| 7,360,362 B2 * | 4/2008 | Nicolle et al. | .................. | 60/612 |
| 7,461,508 B2 * | 12/2008 | Rosin et al. | ..................... | 60/612 |
| 7,600,372 B2 * | 10/2009 | Nishiumi | ........................ | 60/286 |
| 7,607,302 B2 * | 10/2009 | Fry et al. | ........................ | 60/612 |
| 7,735,320 B2 * | 6/2010 | Yanakiev | ........................ | 60/602 |

(Continued)

FOREIGN PATENT DOCUMENTS

DE    02927758 A1    1/1981

(Continued)

OTHER PUBLICATIONS

European Patent Office, European Search Report for Application No. 08000823.8, dated Aug. 24, 2009.

*Primary Examiner* — Thai Ba Trieu
(74) *Attorney, Agent, or Firm* — Ingrassia Fisher & Lorenz, P.C.

(57) ABSTRACT

Arrangement of a two stage turbocharger system for an internal combustion engine including an intake manifold and an exhaust manifold, including a low-pressure turbocharger, a high-pressure turbocharger and a bypass duct in flow communication with an outlet of the low-pressure compressor, an inlet of the high-pressure compressor, an outlet of the high-pressure compressor and an inlet of the intake manifold. The bypass duct includes a first bypass valve for opening and closing the bypass duct. The first bypass valve and the high-pressure compressor are accommodated within a common housing.

16 Claims, 5 Drawing Sheets

U.S. PATENT DOCUMENTS

| | | |
|---|---|---|
| 2003/0002231 A1 | 1/2003 | Dee |
| 2003/0041440 A1 | 3/2003 | Shonai et al. |
| 2003/0042902 A1 | 3/2003 | Kobayashi et al. |
| 2003/0107373 A1 | 6/2003 | Van Zon |
| 2003/0159442 A1* | 8/2003 | Huter et al. ............ 60/612 |
| 2004/0023064 A1 | 2/2004 | Ehresmann et al. |
| 2006/0039091 A1 | 2/2006 | Wan et al. |
| 2006/0042247 A1 | 3/2006 | Haugen |
| 2006/0072249 A1 | 4/2006 | Wakui et al. |
| 2006/0230759 A1* | 10/2006 | Semrau ............ 60/602 |
| 2007/0062188 A1* | 3/2007 | Fry et al. ............ 60/599 |
| 2007/0063690 A1 | 3/2007 | De Wilde et al. |
| 2007/0074513 A1* | 4/2007 | Lamb et al. ............ 60/612 |
| 2007/0169552 A1 | 7/2007 | Shoji et al. |
| 2009/0031722 A1* | 2/2009 | An et al. ............ 60/612 |
| 2009/0128130 A1 | 5/2009 | Stauth et al. |
| 2010/0126016 A1* | 5/2010 | An et al. ............ 29/889.2 |
| 2011/0020108 A1 | 1/2011 | Axelsson et al. |

FOREIGN PATENT DOCUMENTS

| | | |
|---|---|---|
| DE | 03930680 A1 | 3/1991 |
| DE | 10202287 C1 | 8/2003 |
| DE | 10261612 A1 | 12/2003 |
| DE | 10230934 A1 | 1/2004 |
| EP | 1178191 A2 | 2/2002 |
| EP | 1288669 A2 | 3/2003 |
| EP | 1329735 A1 | 7/2003 |
| EP | 1790987 A1 | 5/2007 |
| EP | 1843019 A1 | 10/2007 |
| GB | 1535677 A | 12/1978 |
| GB | 2077354 A | 12/1981 |
| JP | 56138420 A | 10/1981 |
| JP | 02305324 A * | 12/1990 |
| JP | 2005344638 A * | 12/2005 |
| WO | 0194963 A2 | 12/2001 |
| WO | 02097464 A2 | 12/2002 |
| WO | 03003354 A1 | 1/2003 |
| WO | 03003356 A1 | 1/2003 |
| WO | 2004031556 A1 | 4/2004 |
| WO | 2004072672 A2 | 8/2004 |
| WO | 2004074855 A2 | 9/2004 |
| WO | 2005064356 A2 | 7/2005 |
| WO | 2006136577 A1 | 12/2006 |
| WO | 2007098133 A1 | 8/2007 |
| WO | WO 2007098133 A1 * | 8/2007 |
| WO | 2009112412 A1 | 9/2009 |

* cited by examiner

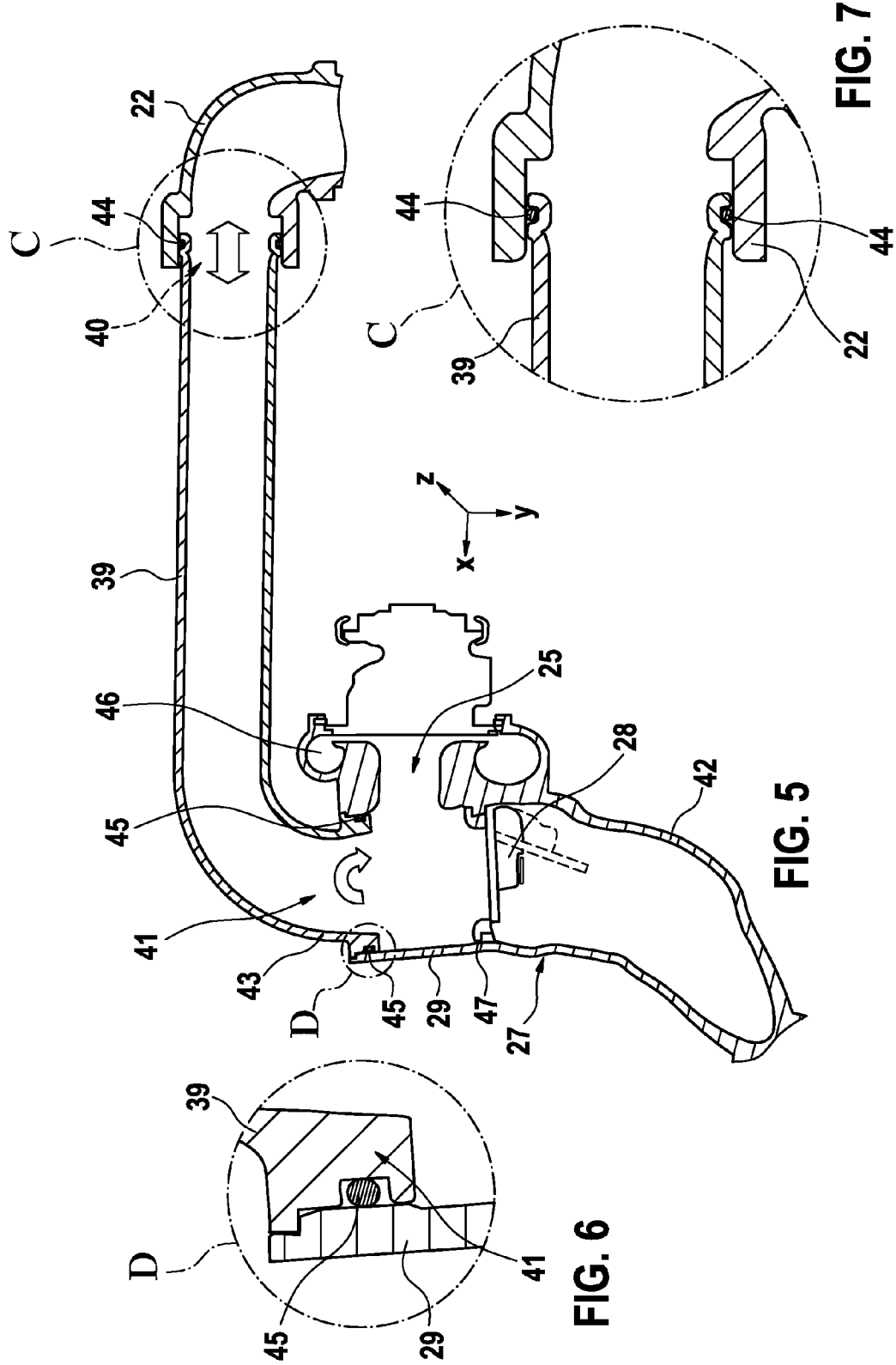

ARRANGEMENT OF A TWO STAGE TURBOCHARGER SYSTEM FOR AN INTERNAL COMBUSTION ENGINE

CROSS-REFERENCE TO RELATED APPLICATION

This application claims priority to European Application No. EP 07108500, filed Jan. 31, 2007, which is hereby incorporated in its entirety by reference.

TECHNICAL FIELD

The invention generally relates to a turbo charger, and more particularly, relates to an arrangement of a two stage turbocharger system for an internal combustion engine.

BACKGROUND

A two stage turbocharger system typically includes a small high-pressure turbocharger and a larger low-pressure turbocharger. A two stage turbocharger system may be used with an internal combustion engine of a vehicle in order to improve engine performance, for example, by providing higher torque at low speeds or to reduce turbo lag.

A two stage turbocharger system of an internal combustion engine is typically driven by the exhaust gases. Various layouts of two stage turbocharger systems as well as various methods of operating the two stage turbocharger systems are known, for example from U.S. Pat. No. 4,930,315 and U.S. Pat. No. 6,981,375.

To lower exhaust emissions, particularly of vehicles, in order to meet ever more stringent environmental standards, a particle filter and/or oxidation catalyst may be provided which are in flow communication with the exhaust gases generated by the engine. It is known to provide an oxidation catalyst close to the engine and an underfloor particle filter. However, a vehicle equipped with such an engine has an undesirably low performance and loss of heat when the particle filter is regenerated.

It is an object of the invention to provide an arrangement of a two stage turbocharger for an internal combustion engine so as to increase the performance and lower the emissions of the engine.

SUMMARY

The invention provides an arrangement of a two stage turbocharger system for an internal combustion engine comprising an intake manifold and an exhaust manifold which comprises a low-pressure turbocharger comprising a low-pressure turbine and a low-pressure compressor, a high-pressure turbocharger comprising a high-pressure turbine and a high-pressure compressor, and a bypass duct. The bypass duct is in flow communication with an outlet of the low-pressure compressor and with an inlet of the high-pressure compressor and with an outlet of the high-pressure compressor and with an inlet of the intake manifold. The bypass duct comprises a first bypass valve for opening and closing the bypass duct. The first bypass valve and the high-pressure compressor are accommodated within a common housing.

The arrangement of the first bypass valve and the high pressure compressor within a common housing has the advantages that the number of joints of the turbocharger system is reduced in comparison to an arrangement in which the high-pressure compressor is accommodated in a first housing and the bypass valve is accommodated within a second housing which is separate from the first housing.

The arrangement of a common housing for the high-pressure bypass valve and the high-pressure compressor has the further advantage that, due to the reduced number of joints and interfaces in the system as a whole, the risk of leakage is reduced. Since sealing of the joints is difficult to maintain over the total lifetime of the engine, the reliability of the engine in creased by eliminating some of the interfaces. This arrangement also provides a more compact layout thus saving valuable space within the space available.

The first bypass valve may also be denoted as a high-pressure compressor bypass valve and may be positioned in the housing or cover of the high-pressure compressor.

Additionally, the number of parts of the engine and the number of machined surfaces is decreased due to the common housing so that manufacturing costs as well as assembly costs of the engine are reduced and part quality is increased.

The first bypass valve, when in the closed position, is adapted so as to direct air from the outlet of the low-pressure compressor to the inlet of the high-pressure compressor and from the outlet of the high-pressure compressor to the inlet of the intake manifold. The air may be denoted as intake air. Consequently, when the first bypass valve is in the closed position, the intake air is compressed by the high-pressure compressor before being supplied to the intake manifold of the engine.

The first bypass valve in the open position is adapted so as to direct air from the outlet of the low-pressure compressor to the inlet of the intake manifold. In the open position, the intake air bypasses the high-pressure compressor and is compressed only by the low-pressure compressor.

In a further embodiment, substantially no air is directed through the high-pressure compressor when the first bypass valve is open. This can be achieved without provided a further valve to seal the inlet to the high-pressure compressor by providing the bypass duct and connections between the low-pressure compressor, the bypass duct and the intake manifold with a greater diameter or cross-sectional area than the connections into the high-pressure compressor.

In a further embodiment, the common housing further comprises the bypass duct in addition to the bypass valve. The bypass duct and bypass valve may be arranged in a housing common to the housing of the high-pressure compressor. The bypass duct comprises an inlet adapted to be in flow communication with the outlet of a low-pressure compressor, and an outlet adapted to be in flow communication with the inlet of an intake manifold. The first bypass valve is positioned between the inlet and the outlet of the bypass duct. The inlet of the high-pressure compressor is in flow communication with the bypass duct upstream of the first bypass valve and the outlet of the high-pressure compressor is in flow communication with the bypass duct downstream of the first bypass valve.

The arrangement of the first bypass valve in relation to the inlet and outlet of the high-pressure compressor allows the first bypass duct to provide the air flows as described above when in the open and closed position.

In a first embodiment, the inlet of the bypass duct is generally orthogonal to the inlet of the high-pressure compressor. In a further embodiment, the inlet of the bypass duct is generally orthogonal to the outlet of the high-pressure compressor. This enables a compact arrangement of the housing and, as is described later, an advantageous arrangement of the air connection pipe from the low-pressure compressor to the inlet of the bypass duct of the common housing.

The first bypass valve may be pneumatically actuated or electrically actuated or hydraulically actuated or automatically check valve actuated. In further embodiments, the first bypass valve is controllable in response parameters comprising at least those of engine speed and engine load. In this sense, controllable is used to denote the opening and closing of the first bypass valve. The bypass valve may, therefore be opened or closed depending on the engine speed. The bypass valve may be closed at low speeds and low engine loads so that only the high-pressure compressor supplies compressed air to the intake manifold and may be opened at higher speeds and higher loads so that only the low-pressure compressor supplies compressed air to the intake manifold, for example.

The common housing which accommodates at least the bypass valve and high-pressure compressor of the high-pressure turbine may provided as a single piece. The common housing may comprise aluminium or an aluminium alloy, for example though materials capable of withstanding the operating conditions for the required lifetime of the part may also be used.

The arrangement of the two-stage turbocharger, in an embodiment, further comprises a pipe. The outlet of the low-pressure compressor is coupled to a first end of the pipe by a free-floating interface and the inlet of the high-pressure compressor is coupled to a second end of the pipe by a second free floating interface.

The free-floating interfaces have the advantage that the tolerance of the pipe to movement caused by thermal expansion is improved. Consequently, the use of a flexible elements such as a flexible pipe to compensate for thermal expansion movement between the low-pressure compressor and the bypass duct is avoided. The pipe may, therefore, be rigid.

In an embodiment, the first free floating interface and the second free floating interface are adapted to accommodate movement between the pipe and the outlet of the low-pressure compressor and the inlet of the high-pressure compressor in two or more directions. This may be provided by arrangement the interfaces generally orthogonal to one another. The arrangement of the two different angles of the free floating interfaces further improves the tolerance of the pipe to movement caused by thermal expansion.

The invention also provides an internal combustion engine comprising a plurality of cylinders, an intake manifold and an exhaust manifold and an arrangement of a two stage turbocharger according to one of the embodiments previously described.

The internal combustion engine may be adapted to run on one or even more than one of a number of different fuels. For example, the internal combustion engine may be adapted to run on diesel, gasoline, or Biofuels such as ethanol, in particular ethanol 85, or mixtures of fuels such as a mixture of gasoline and ethanol.

The low-pressure turbine and the high-pressure turbine may be driveable by exhaust gases from the engine. In this case, the low-pressure turbine and the high-pressure turbine may be in flow-communication with the exhaust manifold.

The internal combustion engine according to one of these embodiments may further comprise a second bypass valve for directing the flow of exhaust gases to the low-pressure turbine and the high-pressure turbine. This enables the high-pressure valve and low-pressure valve to be driven independently of one another or simultaneously.

The second bypass valve may be adapted to direct the proportion of exhaust gases between the low-pressure turbine and the high-pressure turbine in response to the number of revolutions per minute of the engine. Thus the turbocharger which is driven by the exhaust gases may be selected in response to engine speed. For example, only the high-pressure turbine may be driven at low speeds and only the low-pressure turbine may be driven at high speeds.

In a further embodiment the first bypass valve and the second bypass valve are operable in response to the engine speed so as to provide a highly response turbocharger system to improve both the efficiency as well as performance of the engine. If the engine is supplied in a vehicle the drivability of the vehicle may be improved.

In a further embodiment, the outlet of the high-pressure turbine and of the low pressure turbine is in flow communication with emission after treatment apparatus. The emission after treatment apparatus may be provided by an oxide catalyst and a particle filter, a particle filter and a Lean $NO_x$ trap or a UREA controlled $NO_x$ reduction system or a three-way catalytic converter.

The type of emission after treatment apparatus may be selected depending on the fuel on which the engine is run as well as the emission after treatment which is desired or required by local laws. For example, a gasoline engine may comprise emission after treatment apparatus in the form of a three-way catalytic converter. A diesel engine may be equipped with emission after treatment apparatus comprising at least an oxide catalyst and a particle filter or with a particle filter and a Lean $NO_x$ trap, for example.

The particle filter may be a close coupled diesel particle filter. Since the common housing provided for the first bypass valve and high-pressure compressor is compact, space is freed up close to the outlet of the turbines of the two-stage turbocharger enabling a close coupled diesel particle filter to be accommodated.

Some two stage charging systems for internal combustion engines have a close coupled catalyst combined with an underfloor diesel particle filter. Future applications as well as some current vehicle platforms mean that packaging of the underfloor diesel particle filter is difficult. To solve this problem, it is known to use a close coupled diesel particle filter in combination with the catalyst. However, it is difficult to accommodate a close coupled diesel particle filter for two-stage charging systems due to both the design of the two stage system, with one turbocharger above the exhaust manifold and a second turbocharger below the exhaust manifold, and the space available at the exhaust side of the engine.

By positioning the high-pressure compressor bypass valve within a housing which is common to the housing of the high-pressure compressor, space can be saved, making the system more compact and allowing the use of a close coupled diesel particle filter with the two-stage turbocharger.

Additionally, the air routing is simplified and the pluming of the intake air is reduced. By replacing a separate compressor bypass valve housing with an integrated compressor housing and bypass valve unit in the high-pressure compressor cover, several joints in the air routing system can be eliminated. The benefits of this integration are a compact layer and less packaging problems, fewer interfaces and thereby a reduced risk of leakage and a reduced number of parts and machine surfaces which reduces the cost.

The air connection between the low-pressure compressor outlet and the common housing accommodating the high-pressure compressor and bypass valve is also improved by arranging the pipe connection between them to be free-floating at both ends and, in a further improvement, in two different angles as well. This enables the air connection between the low-pressure compressor outlet and the inlet of the common housing of the high-pressure compressor and bypass valve to tolerate movement by thermal expansion without the use of a flexible unit.

The invention also provides a housing for a two stage turbocharger system for an internal combustion engine. This housing may be suitable for use in the arrangement according to one of the embodiments described above. The housing comprises a first cutout adapted to accommodate a high-pressure compressor impeller of a high-pressure turbocharger, and a bypass duct. The first cutout is the high-pressure compressor scroll. The bypass duct comprises an inlet adapted to be in flow communication with an outlet of a low-pressure compressor, an outlet adapted to be in flow communication with an inlet of an intake manifold, and a second cutout adapted to accommodate a bypass valve for opening and closing the bypass duct. The first cutout is in flow communication with the bypass duct at a first position upstream of the second cutout and at a second position downstream of the second cutout.

This arrangement of the second cutout for the bypass valve in relation to the position of the inlet and outlet of the first cutout for the impeller of the high-pressure compressor enables the valve to act as a high-pressure compressor bypass valve when the bypass valve and compressor is assembled in the housing and this arrangement is part of a two stage turbo charger.

The housing may be provided as a single piece and may comprise aluminium or an aluminium alloy. The single piece may be cast and machined or cast in approximately the desired form and further worked to provide the exact dimensions and/or surface finish.

In a further embodiment, the inlet of the bypass duct is generally orthogonal to the first cutout. The second cutout is adapted to receive a flap valve if, for example, the bypass valve is provided in the form of a flap valve.

The common housing may further comprising a second outlet. This second outlet may be the outlet from the high-pressure compressor. In an embodiment, the second outlet is in flow communication with the first outlet within the housing.

In an alternative embodiment, the second outlet is separate from the first outlet within the housing and the first and second outlets are in floe communication at a position outside of the housing.

The housing may also be provided as part of an assembled sub-assembly for use in a turbocharger, a two-stage turbocharger as well as an engine or vehicle comprising the turbocharger or two-stage turbocharger.

The invention also provides a turbocharger comprising a turbine and a compressor impeller drivable by rotational movement of the turbine, characterized by a housing according to one of the embodiments described.

BRIEF DESCRIPTION OF THE DRAWINGS

The present invention will hereinafter be described in conjunction with the following drawing figures, wherein like numerals denote like elements.

FIG. 5 illustrates a cross-sectional view of a portion of the two stage turbocharger system;

FIG. 6 illustrates an enlarged view of region D of FIG. 5; and

FIG. 7 illustrates an enlarged view of region C of FIG. 5.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
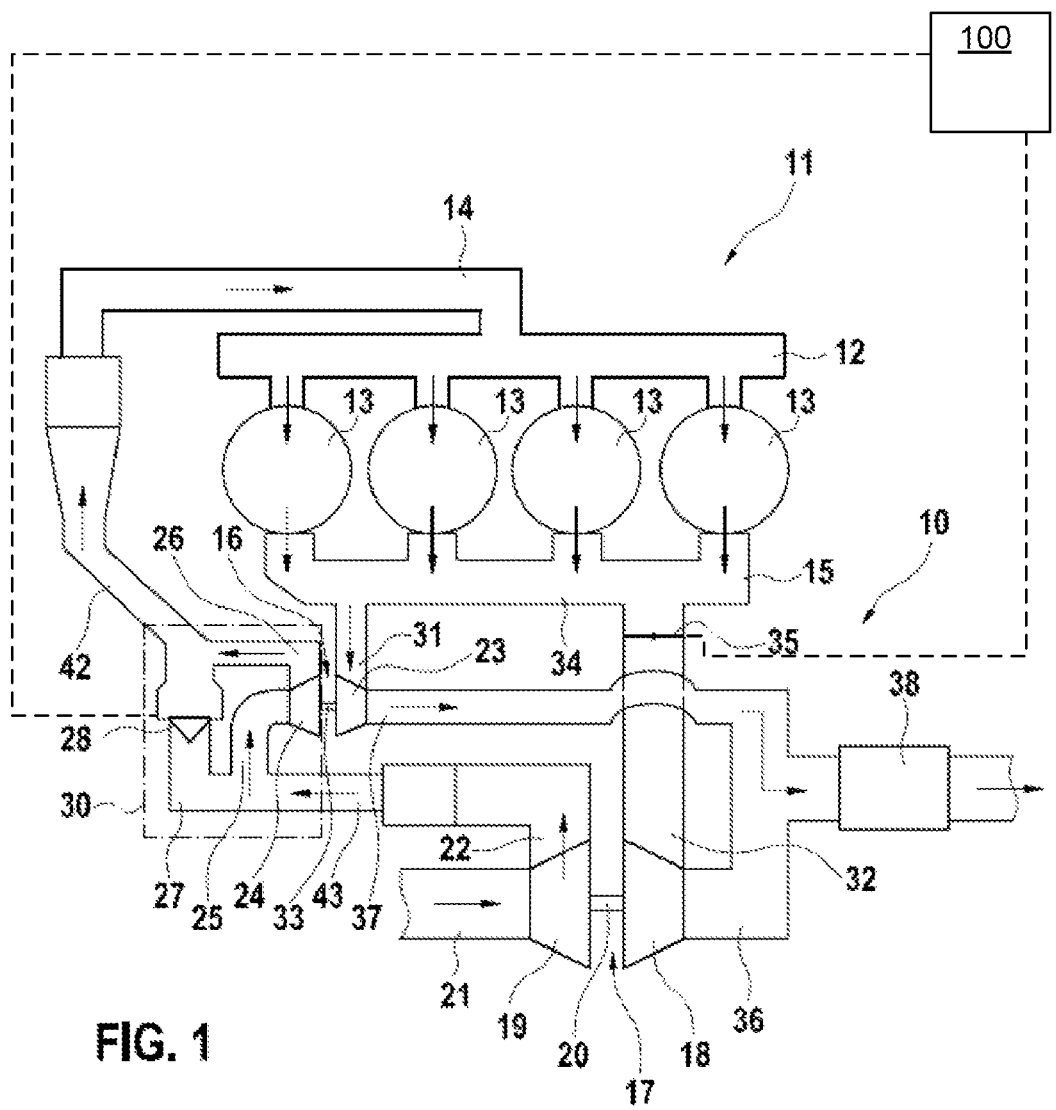
FIG. 1 illustrates a system diagram of a two stage turbocharger system of an internal combustion engine in a first operating condition.
Figure 2:
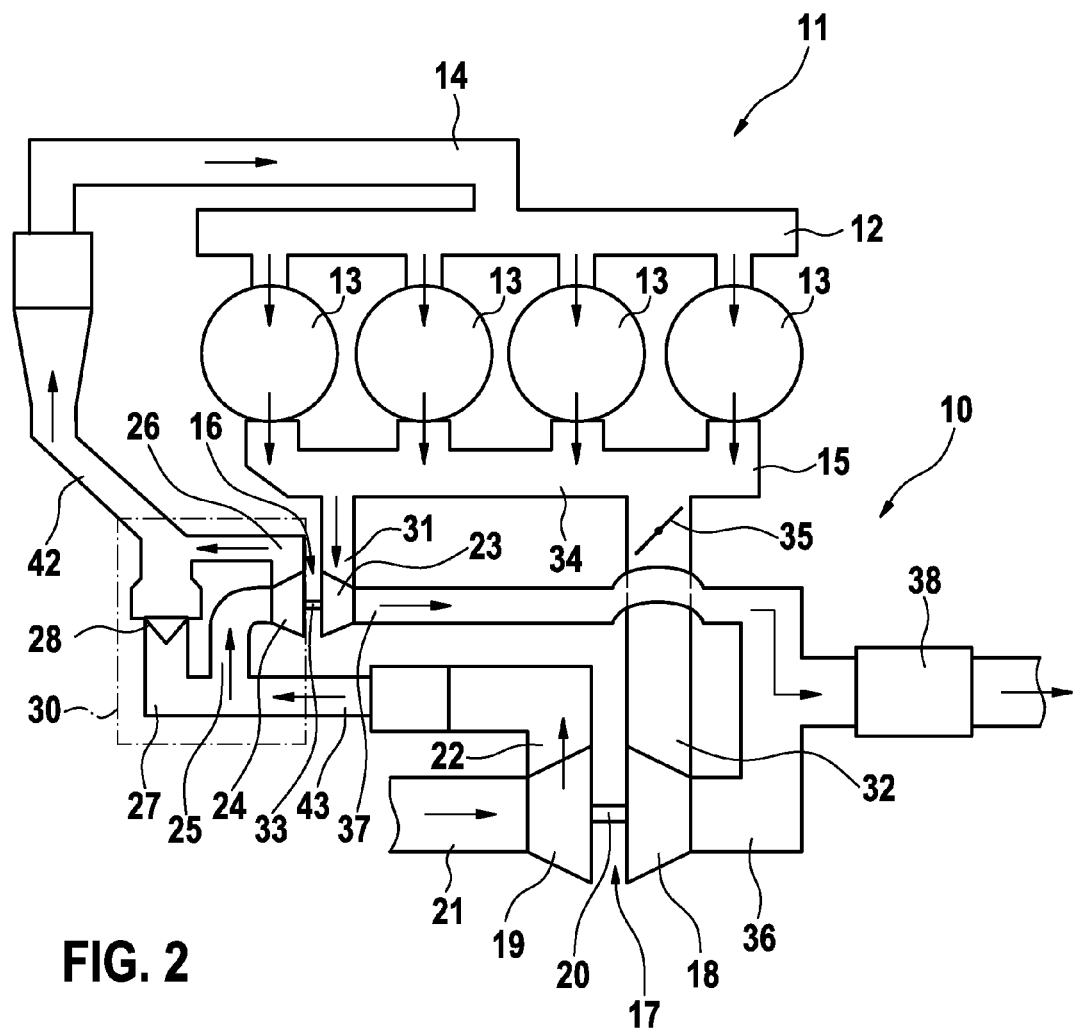
FIG. 2 illustrates a system diagram of a two stage turbocharger system of an internal combustion engine in a second operating condition.
Figure 3:
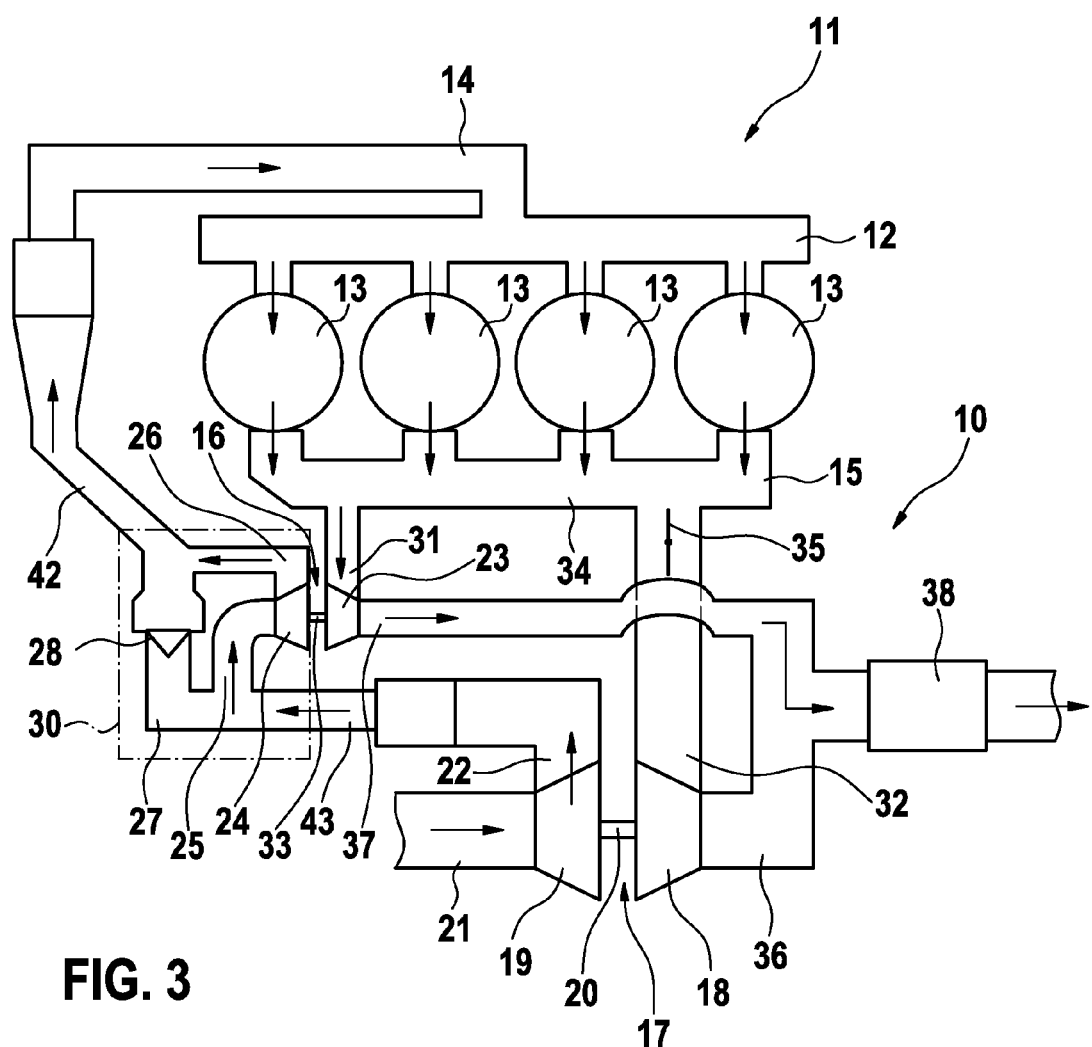
FIG. 3 illustrates a system diagram of a two stage turbocharger system of an internal combustion engine in a third operating condition.

FIGS. 1 to 3 illustrate a system diagram of a two stage turbocharger system 10 of an internal combustion engine 11 operating in three different conditions. The two-stage turbocharger system 10 is illustrated in three-dimensional form in FIG. 4 and in cross-section in FIGS. 5 to 7.

The internal combustion engine 11 includes an engine block 12 with a plurality of cylinders 13. The illustrated engine is a compression-ignition internal combustion engine such as a diesel fuel engine. The two-stage turbocharger system is not, however, limited for use with diesel engines and may be used for engines running on fuels such as gasoline, ethanol and mixtures of gasoline and ethanol, for example. The cylinders 13 receive pressurized fuel from a fuel supply in a known manner. The engine 11 includes an intake manifold 14 and an exhaust manifold 15. The engine 11 is a turbocharged engine and includes a two stage turbocharger system 10.

The two stage turbocharger system 10 includes a small high-pressure (HP) turbocharger 16 and a large low-pressure (LP) turbocharger 17 and has an arrangement such that either the high-pressure turbocharger 16 or the low-pressure turbocharger 17 may operate alone or such that the high-pressure turbocharger 16 and the low-pressure turbocharger 17 operate together.

The low-pressure turbocharger 17 includes a turbine 18 with a turbine impeller (not illustrated) driven by exhaust gas from the exhaust manifold 15 which is connected by a shaft 20 to a compressor impeller (not illustrated) of compressor 19. The compressor 19 has an inlet 21 receiving fresh intake air and an outlet 22.

The high pressure turbocharger 16 includes a turbine 23 with a turbine impeller (not illustrated) driven by exhaust gas from the exhaust manifold 15 and a compressor 24 including a compressor impeller (not illustrated) connected by a shaft 33 to the turbine impeller. The compressor 24 has an inlet 25 in flow communication with the outlet 22 of the low pressure compressor 17 and an outlet 26 providing high pressure compressed air to intake manifold 14.

The outlet 22 of the low-pressure compressor 19 is in flow communication with the inlet 25 of the high-pressure compressor 24 and by a bypass duct 27 with the intake manifold 14 of the engine 11. The bypass duct 22 comprises a first valve 28 which is a high-pressure compressor bypass valve. The first valve 28 enables the compressed air from the low pressure compressor 19 to be directed to the high-pressure compressor 24 and/or the intake manifold 14.

The high-pressure compressor bypass valve 28 is accommodated within the housing 29 of the high-pressure compressor 24 of the high-pressure turbocharger 16. The housing 29 is schematically illustrated in FIGS. 1 to 3 by the box 30 and is described in more detail in conjunction with FIGS. 4 to 7.

The turbine 18 of the low-pressure turbocharger 17 and the turbine 23 of the high-pressure turbocharger 16 each have an inlet 31, 32 in flow communication with an exhaust supply duct 34 which is coupled to the exhaust manifold 15. The exhaust supply duct 34 comprises a second bypass valve 35, which is a high-pressure turbine bypass valve, which enables the exhaust gas to be directed to the high-pressure turbine 23 and/or the low-pressure turbine 18. The exhaust gas exits the low-pressure turbine 18 and the high-pressure turbine 23 by outlets 36, 37 and through the emission after treatment apparatus 38 which, in this embodiment, is an oxide catalyst and particle filter accommodated within a single housing.

Figure 4:
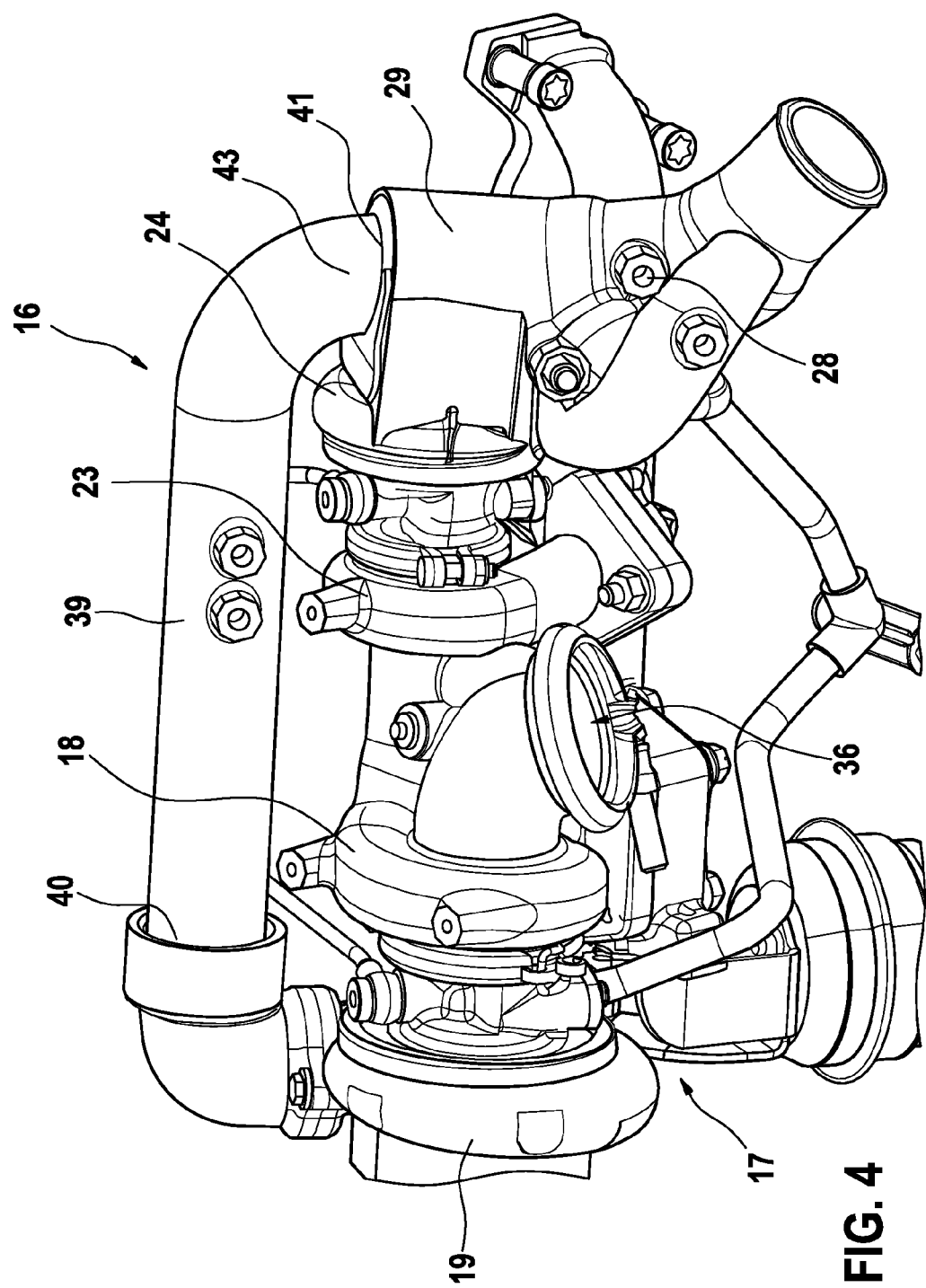
FIG. 4 illustrates a three dimensional view of a portion of an internal combustion engine comprising an arrangement of the two stage turbocharger system of FIGS. 1 to 3.

A three-dimensional view of the two stage turbocharger system 11 is illustrated in FIG. 4. FIGS. 5 to 7 illustrate cross-sectional views of the housing 29. The housing 29 may be formed from a single cast aluminium or aluminium-based alloy block.

The high-pressure compressor bypass valve 28 and the bypass duct 27 are integrated into the housing 29 of the high-pressure compressor 24. This arrangement provides a more compact layout thus saving valuable space within the confined spaced available. This arrangement of the high-pressure compressor bypass valve 28 in the housing 29 or cover of the high-pressure compressor 24 has the further advantage that the number of joints and interfaces in the system as a whole is reduced so that the risk of leakage is reduced. Since sealing of the joints is difficult to maintain over the total lifetime of the engine, the reliability of the engine in creased by eliminating some of the interfaces. Additionally, the number of parts of the engine and the number of machined surfaces is decreased due to the common housing so that manufacturing costs as well as assembly costs of the engine are reduced and part quality is increased.

The single housing unit 29 also enables the air connection between the outlet 22 of the low-pressure compressor 19 and the inlet 43 of the housing 29 to be modified to include a connection in the form of a pipe 39 which is arranged free-floating at both ends 40, 41. In other words, the interface between a first end 40 of the pipe 39 and the outlet 22 of the low-pressure compressor 19 is free floating and the interface between the second end 41 of the pipe 39 and the inlet 43 of the housing 29 is free floating. The pipe 39 is also arranged at two different angles and has a general L-shape. The arrangement of the two different angles as well as the free floating interfaces improves the tolerance of the pipe 39 to movement caused by thermal expansion without the use of a flexible elements such as a flexible pipe to compensate for thermal expansion movement.

FIG. 5 illustrates a cross-sectional view of the housing 29 and pipe 39 illustrated in three-dimensional form in FIG. 4.

The housing 29 comprises the bypass duct 27, bypass valve 28 as well as the inlet 25 and outlet 26 of the high-pressure compressor 24. The housing 29 also comprises cutout 46 providing a high-pressure compressor scroll 46 adapted to accommodate the compressor impeller (not illustrated) of the high-pressure compressor 24. This cutout 46 is coupled to the bypass duct 27 by two through holes which provide the high-pressure compressor inlet 25 and outlet 26, respectively.

The housing 29 further comprises a second cutout 47 adapted to accommodate the first bypass valve 28. The first bypass valve 28 is illustrated as a flap valve though other types of valve may be used. The first bypass valve 28 is positioned in the bypass duct 27 so that the inlet 25 of the high-pressure compressor 24 is upstream and the outlet 26 of the high-pressure compressor 24 is downstream of the first bypass valve 28. When the first bypass valve 28 is in the closed position, air is directed to the inlet 25 of the high-pressure compressor 19. When the first bypass valve 28 is in the open position, illustrated by the dotted lines, air is directed to the outlet 42 of the bypass duct 27 bypassing the high-pressure compressor 19.

The pipe 39 extends between the outlet 22 of the low-pressure compressor 29 and the inlet 43 of the housing 29 which is also the inlet to the bypass duct 27.

The interface between the first end 40 of the pipe 39 and the outlet 22 of the low-pressure compressor 19 is illustrated in more detail in FIG. 7 and comprises a seal 44 between the outer surface of the pipe 39 and inner surface of the low-pressure compressor outlet 22 in the region of the overlap to provide a free-floating interface which tolerates movement between the pipe 39 and low-pressure compressor outlet 22 along the longitudinal axis of the joint.

The interface between the second end 41 of the pipe 39 and the inlet 43 of the housing 29 is illustrated in more detail in FIG. 6 and also comprises a seal 45 between the outer surface of the pipe 39 and inner surface of the inlet 43 in the region of the overlap to provide a free-floating interface.

Since the pipe has a general L-shape, the combination of the two free-floating interfaces allows relative movement the pipe with respect to the low-pressure compressor 19 and housing 29 to be accommodated in two directions which are generally orthogonal to one another. Movement of the parts due to thermal expansion may therefore be compensated without the use of a flexible pipe.

The engine 11 and the two stage turbocharger system 10 may be operated as follows. FIG. 1 illustrates the condition of the two bypass valves 28, 35 of the two stage turbocharger system 10 at low engine speeds and loads, for example below around 1800 rpm. The high pressure turbine bypass valve 35 is closed and the high-pressure compressor valve 28 is closed. All of the exhaust gas enters the high pressure turbine 23 and air is compressed only by the high-pressure compressor 24 which is supplied to the intake manifold 14.

At higher engine speeds and loads, for example between 1800 rpm and 3000 rpm, illustrated in FIG. 2, the high-pressure turbine bypass valve 35 is partially opened whilst the high-pressure compressor bypass valve 28 remains closed. Exhaust gas drives both the low-pressure turbine 18 and high pressure turbine 23. The large low-pressure compressor 19 pre-compresses the fresh air which is directed into the inlet 25 of the high-compressor compressor 24 where it is further compressed before entering the intake manifold 14.

At even higher engine speeds and loads, for example over 3000 rpm, illustrated in FIG. 3, the high-pressure turbine bypass valve 35 is fully opened and the high-pressure compressor valve 28 opened. Exhaust gas is directed only to the larger low-pressure turbine 18. Only the low-pressure compressor 19 compresses the intake air which is directed towards the intake manifold 14 via the bypass duct 27. Substantially no air enters the high-pressure compressor 25.

The bypass valves 28, 35 are operated in response to, among other parameters, the engine speed by an engine management system 100.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An arrangement of a two stage turbocharger system for an internal combustion engine comprising an intake manifold and an exhaust manifold, comprising:
   a low-pressure turbocharger comprising a low-pressure turbine and a low-pressure compressor;
   a high-pressure turbocharger comprising a high-pressure turbine and a high-pressure compressor;
   a bypass duct in flow communication with an outlet of the low-pressure compressor and with an inlet of the high-pressure compressor and with an outlet of the high-pressure compressor and with an inlet of the intake manifold, the bypass duct comprising a bypass valve for opening and closing the bypass duct;
   a common housing, wherein the bypass valve and the high-pressure compressor are each integrated within the common housing; and
   a pipe, wherein the outlet of the low-pressure compressor is coupled to a first end of the pipe by a first free-floating interface and the inlet of the high-pressure compressor is coupled to a second end of the pipe by a second free floating interface, wherein the first free-floating interface is orthogonal to the second free-floating interface.

2. The arrangement according to claim 1, wherein air is directed from the outlet of the low-pressure compressor to the inlet of the high-pressure compressor and from the outlet of the high-pressure compressor to the inlet of the intake manifold when the bypass valve is in a closed position.

3. The arrangement according to claim 1, wherein the air is directed from the outlet of the low-pressure compressor to the inlet of the intake manifold when the bypass valve is in an open position.

4. The arrangement according to claim 3, wherein substantially no air is directed through the high-pressure compressor when the bypass valve is in the open position.

5. The arrangement according to claim 1, wherein the common housing further comprises the bypass duct, the bypass duct comprising:
   an inlet being in flow communication with the outlet of the low-pressure compressor;
   an outlet being in flow communication with the inlet of the intake manifold; and
   the bypass valve being positioned between the inlet and the outlet,
   wherein the inlet of the high-pressure compressor is in flow communication with the bypass duct upstream of the bypass valve and the outlet of the high-pressure compressor is in flow communication with the bypass duct downstream of the bypass valve.

6. The arrangement according to claim 5, wherein the inlet of the bypass duct is generally orthogonal to the inlet of the high-pressure compressor.

7. The arrangement according to claim 5, wherein the inlet of the bypass duct is generally orthogonal to the outlet of the high-pressure compressor.

8. The arrangement according to claim 5, wherein the common housing further comprises an additional outlet, the additional outlet being the outlet of the high-pressure compressor.

9. The arrangement according to claim 8, wherein the additional outlet is in flow communication with the first outlet within the common housing.

10. The arrangement according to claim 8, wherein the additional outlet is separate from the outlet within the common housing.

11. The arrangement according to claim 1, wherein the bypass valve is pneumatically actuated or electrically actuated or hydraulically actuated.

12. The arrangement according to claim 1, wherein the bypass valve is controllable in response to parameters comprising at least one of engine speed and engine load.

13. The arrangement according to claim 1, wherein the common housing, the bypass duct, and the inlet of the high-pressure compressor are provided as a single piece.

14. The arrangement according to claim 1, wherein the common housing comprises aluminium.

15. The arrangement according to claim 1, wherein the first free floating interface and the second free floating interface are adapted to accommodate movement between the pipe and the outlet of the low-pressure compressor and the inlet of the high-pressure compressor in at least first and second orthogonal directions, and wherein the first free floating interface is configured to accommodate rotational movement in a plane defined by the first and second orthogonal directions.

16. The arrangement according to claim 1, wherein the pipe is rigid.

* * * * *